United States Patent [19]

Sharma et al.

[11] Patent Number: 5,555,341
[45] Date of Patent: Sep. 10, 1996

[54] WAVEGUIDE WITH AN ELECTRICALLY CONDUCTIVE CHANNEL

[75] Inventors: Ravinder K. Sharma, Mesa; Michael S. Lebby, Apache Junction; Davis H. Hartman, Phoenix; Kent W. Hansen, Scottsdale, all of Ariz.

[73] Assignee: Motorola, Inc., Schaumburg, Ill.

[21] Appl. No.: 214,524

[22] Filed: Mar. 18, 1994

[51] Int. Cl.⁶ .................................................. G02B 6/10
[52] U.S. Cl. ........................... 385/129; 385/132; 385/14; 385/88; 385/123
[58] Field of Search ................................. 385/129, 130, 385/131, 132, 14, 88, 89, 123, 124, 125, 126

[56] References Cited

U.S. PATENT DOCUMENTS

| | | | |
|---|---|---|---|
| 5,170,448 | 12/1992 | Ackley | 385/14 X |
| 5,249,245 | 9/1993 | Lebby et al. | 385/14 X |
| 5,282,071 | 1/1994 | Hartman et al. | 385/14 X |
| 5,309,537 | 5/1994 | Chun et al. | 385/89 X |

*Primary Examiner*—Frank Gonzalez
*Assistant Examiner*—Phan T. H. Palmer
*Attorney, Agent, or Firm*—Gary F. Witting

[57] ABSTRACT

An electrically conductive waveguide is provided. A waveguide including a core region, a cladding region, a first surface and an end surface is fabricated. Cladding region covers a portion of the core region forming the first surface, and a portion of the core region and the cladding region form the end surface. The first surface and the end surface meet to form a nexus. An opening located at the nexus of the first surface and the end surface is formed with a conductive member located in the opening.

12 Claims, 3 Drawing Sheets

WAVEGUIDE WITH AN ELECTRICALLY CONDUCTIVE CHANNEL

BACKGROUND OF THE INVENTION

This invention relates, in general, to fabrication of optical devices and, more particularly, to coupling photonic devices and waveguides together.

This application relates to United States issued patent bearing U.S. Pat. No. 5,265,184, titled MOLDED WAVEGUIDE AND METHOD FOR MAKING SAME, issued on Nov. 23, 1993, and copending patent application being Ser. No. 08/019,731, titled MOLDED WAVEGUIDE WITH A UNITARY CLADDING REGION AND METHOD OF MAKING, filed on Feb. 19, 1993; now U.S. Pat. No. 5,313,545 both of which are hereby incorporated by reference herein.

At present, coupling of a photonic device to a waveguide is a difficult task that is typically achieved manually. Manual coupling is complex, inefficient, costly, and unsuitable for high-volume manufacturing. Current fabrication methods and structures do not facilitate easy electromechanical coupling between the photonic device and the waveguide.

It can be readily seen that current manual coupling of a photonic device to a waveguide has severe limitations. Also, it is evident that present processes used for coupling the photonic device and the waveguide are not only complex and expensive, but ineffective. Therefore, an article and a method that allows for efficient and effective coupling of the photonic device to the waveguide would be highly desirable.

SUMMARY OF THE INVENTION

Briefly stated, an electrically conductive waveguide is provided. A waveguide including a core region, a cladding region, a first surface and an end surface is fabricated. Cladding region covers a portion of the core region forming the first surface, and a portion of the core region and the cladding region form the end surface. The first surface and the end surface meet to form a nexus. An opening located at the nexus of the first surface and the end surface is formed with a conductive member located in the opening.

DETAILED DESCRIPTION OF THE DRAWINGS

Figure 1:
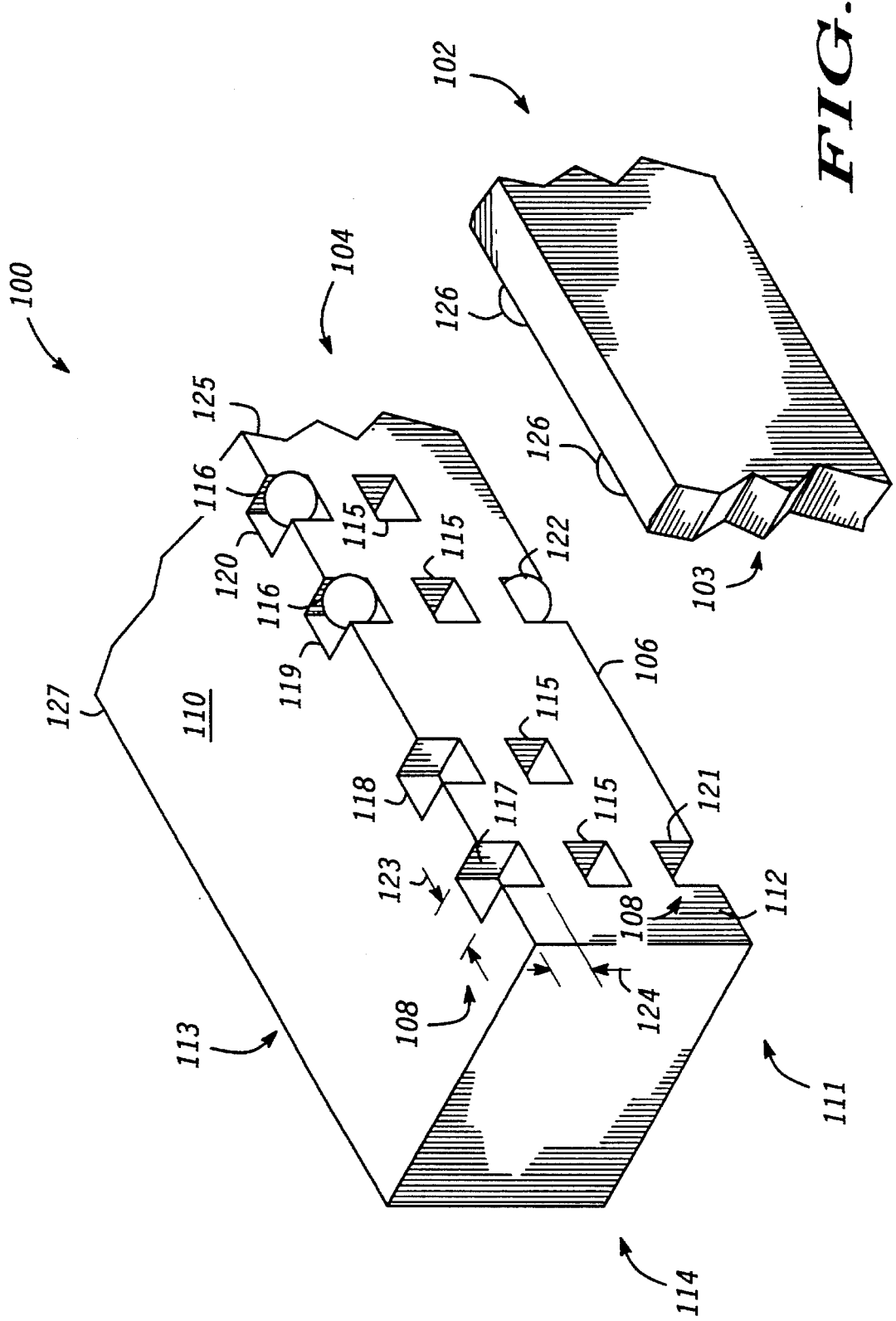
FIG. 1 is an enlarged perspective view of a waveguide and photonic device.

FIG. 1 is an enlarged, simplified perspective view of an optical waveguide 100 and a portion of a photonic device 102. Typically, waveguide 100 is fabricated with a plurality of core regions 104 that are surrounded by a cladding region 106.

Generally, both the plurality of core regions 104 and the cladding region 106 are made of a hard, optically transparent polymer, wherein the plurality of core regions 104 have a higher refractive index than do cladding region 106, thus allowing efficient light confinement and efficient light transmission through core region 104. Commonly, there is a refractive index difference of at least 0.01 between the plurality of core regions 104 and cladding region 106 with the plurality of core regions 104 being higher than cladding region 106.

Generally, waveguide 100 is manufactured with cladding region 106 with surface 110, end portions 111 and 114 with end surfaces 112 and 113, plurality of core regions 104 with surfaces 115, and a plurality of cutouts 108. The plurality of core regions 104 typically traverse through cladding region 106 of waveguide 100 from end surface 112 to end surface 113. While FIG. 1 illustrates several individual core regions, it should be understood that selection of an actual number of core regions depends upon specific design requirements, which can allow for any number of core regions. Also, several configurations of the plurality of core regions 104 can be formed, such as splits, adiabatic tapering, curves, and the like. Surface 110 and end surfaces 112 and 113 meet to form nexus 125 and 127.

As shown in FIG. 1, a plurality of cutouts or openings 108 is made so that portions of surfaces 110 and 112 are removed. The plurality of cutouts or 108 is made by any suitable method, such a milling, molding, laser ablating, or the like. Specific size, location, and configuration of the plurality of cutouts 108 are design specific, thereby allowing modification in accordance to the design. For example, cutouts 117, 118, 119 and 120 are located above cutouts 121 and 122. Further, while FIG. 1 illustrates the cutouts 117 and 118 as having a rectangular shape, they can be designed in other shapes, such as spheres, grooves, and the like.

By way of example, cutout 117 is made in a rectangular form having a width 123 and depth 124 ranging from 0.5 mills (12.2 microns) to 5.0 mils (167 microns) so as to secure conductive member 116 in any one of the cutouts. In a preferred embodiment of the present invention, both width 123 and depth 124 range from 3.0 mils (76.2 microns) to 4 mills (111.6 microns), thereby providing a secure fit for conductive member 116.

Conductive member 116 is made of any suitable material having any suitable shape. For example, conductive member 116 can be shaped into balls made of any conductive material, such as solder balls, gold balls, conductive epoxy balls, or the like. Further, conductive member 116 can be made so as to fill or partially fill opening or cut-out 108.

End portions 111 and 114 provide optical coupling with end surfaces 112 and 113. For example, end surface 112 provides surfaces 115 of the plurality of core regions 104 to allow for a working portion 103 of a photonic device 102 to be coupled to surface 115. Further, since conductive members 116 are aligned with surface 115 and since conductive members 126 are aligned with working portion 103, bonding of conductive members 116 and 126 aligns working portion 103 with surfaces 115, thereby efficiently and economically coupling photonic device 102 to waveguide 100.

Figure 2:
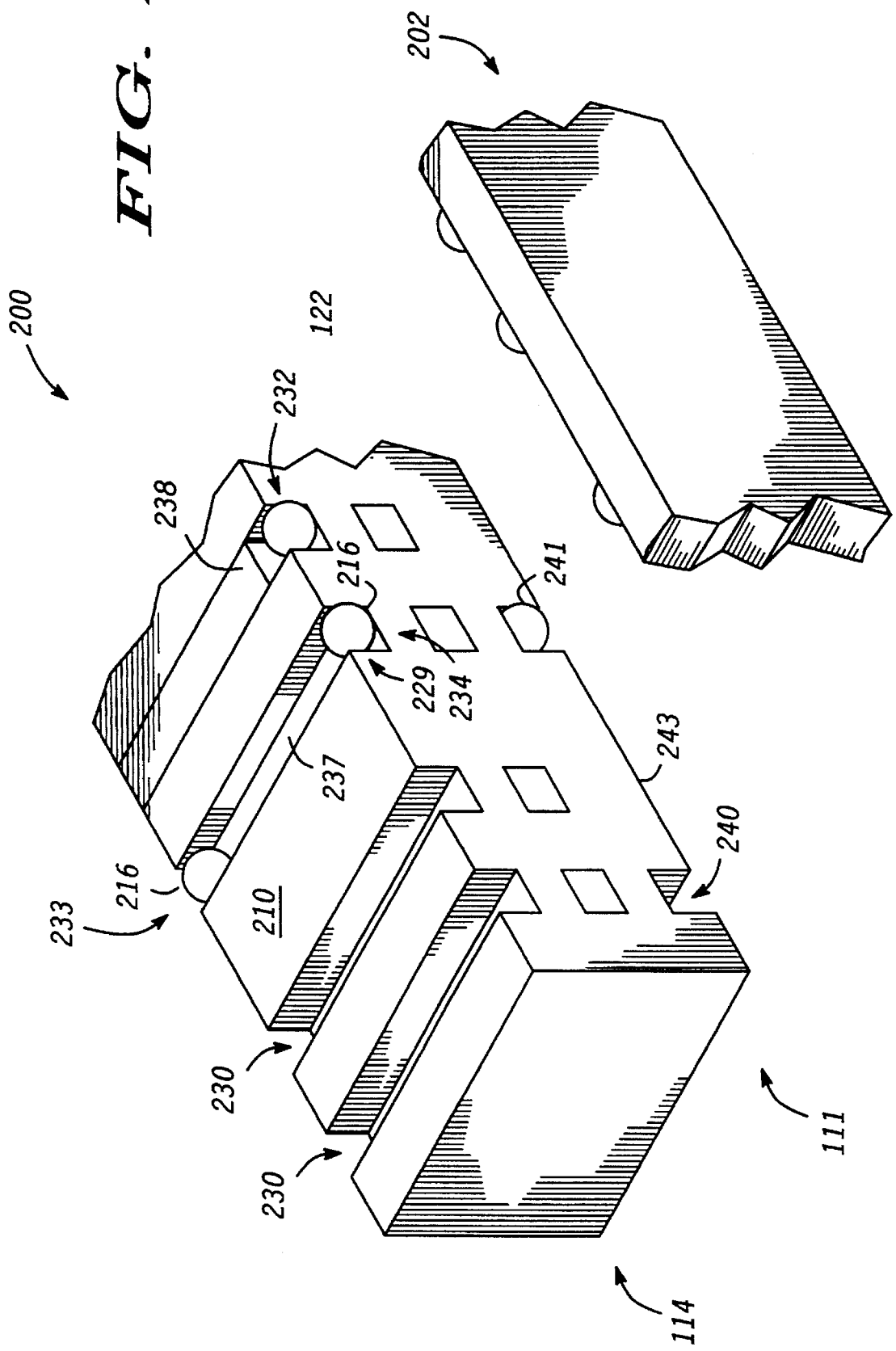
FIG. 2 is an enlarged perspective view of a waveguide and a photonic device.

FIG. 2 is an enlarged, simplified perspective exploded view of a waveguide 200 and a photonic device 202. It should be understood that similar features previously described in FIG. 1 will retain their original identifying numerals, except that the first numeral will be changed to a two.

As can be seen in FIG. 2, waveguide 200 is similar to waveguide 100 of FIG. 1, except for modifications to surface 210 of waveguide 200. More specifically, grooves 230 are formed in surface 210 so as to provide a channel. It should be understood that while channels 230 are illustrated as traversing from end 211 to end 214, alternative configurations for channels 230 can be formed, such as curves, splits, and the like. Channels 230 are made by any suitable method, such as milling, molding, stamping, or the like, thus a wide variety of geometric configurations can be formed.

Channels 229 and 232 illustrate further processing of the already formed channels on surface 210. As illustrated by channel 229, once the channel has been formed, conductive members 216 are placed at channel ends 233 and 234, thereby partially enclosing channel 229. After the conductive members 216 are placed, a conductive substance fills in the partially enclosed channel 229, thereby providing a conductive surface 237.

Alternately, as illustrated by channel 232, a conductive substance 238 is disposed directly into channel 230, thereby providing a conductive surface throughout channel 232.

Conductive surfaces 237 and 238 are made of any suitable conductive material, such as epoxies, polyimide, solder pastes, and the like. However, in a preferred embodiment of the present invention, conductive surfaces 237 and 238 are made of conductive epoxies, thus providing a conductive bondable surface and a material that is used easily and efficiently.

Channels 240 and 241 illustrate that channels and conductive surfaces can be made in surface 243.

Figure 3:
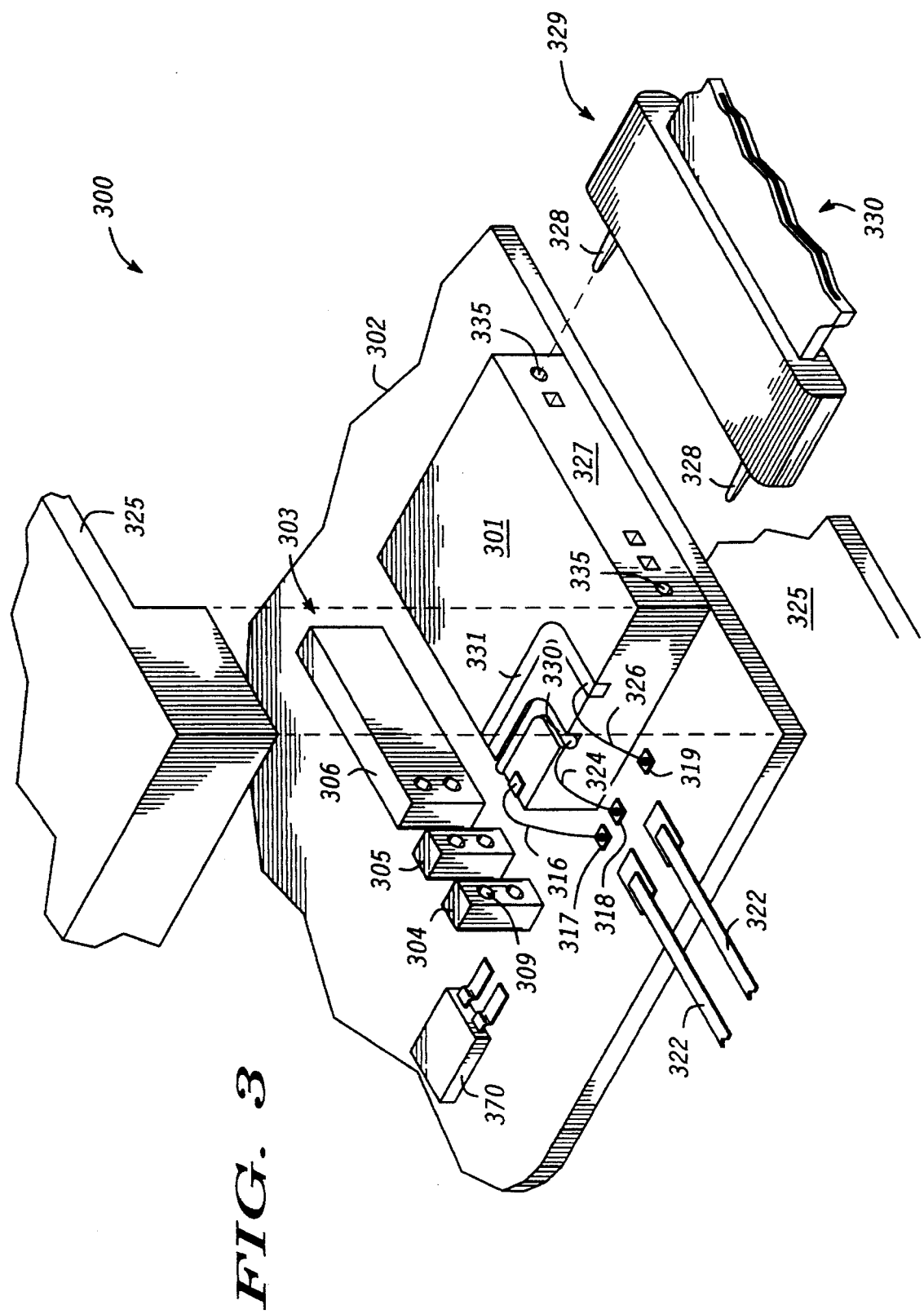
FIG. 3 is an enlarged pictorial view of an optoelectronic module.

FIG. 3 is a simplified, partially exploded view of an optical electronic module 300. In the present invention, optical components 303 are electrically coupled to standard electronic components, such as capacitors, resistors, conductive elements integrated circuits 370, and the like.

Typically, waveguide 301 is fitted with optical components 303 such as a phototransmitter or a laser 304, a photodetector or a photodiode 305, or a combination of both lasers and detectors. Alternately, an array 306 is can be mounted on waveguide 301, which contains a variety of optical components. The optical components are mounted to waveguide 301 in such a manner that individual working portions of the optical components are aligned to a core region of an individual waveguide, thus providing maximum light transmission through individual waveguides. For example, laser 304 is mounted to conductive member 310 by any suitable method, thereby making electric and mechanical connection 309. Mounting of laser 304 to conductive member 310 typically is achieved by solder balls, gold balls, conductive adhesives, or the like. By accurately placing laser 304 to molded optical waveguide 301 and making electrical and mechanical connection 309, light transmission from working portion of laser 304, which is guided through waveguide 301, is maximized. Generally, molded optical waveguide 301 with mounted optical components is joined to interconnect board 302 by any suitable method, such as adhering, press fitting, molding, or the like. However, in a preferred embodiment of the present invention, epoxy adhesive is applied to interconnect board in an approximate location where the molded optical waveguide 301 and the interconnect board 302 are to be bonded. Typically, waveguide 301 is placed on the adhesive by an automated system such as a robot arm, thereby providing accurate placement and orientation of waveguide 301.

Subsequent electrical couplings of standard electrical components such as integrated circuit 370 on interconnect board 301 to optical components 303 is achieved by any suitable method, such as wire bonding, bump bonding, or the like. For example, as illustrated in FIG. 3, wire bond 316 electrically couples conductive member 310 with bonding pad 317, wire bond 324 electrically couples conductive material 330 to bonding pad 318, and wire bond 326 electrically couples conductive material 331 to bonding pad 319. It should be evident by one skilled in the art that many more electrical couplings typically are necessary to fully utilize inputs and outputs of both standard electronic components and the optical components. It should be further evident that standard output and input means, represented by leads 322, are used to couple other components as well.

Further, plastic encapsulation of integrated circuit board 302 and molded optical waveguide 301 typically is achieved by an overmolding process, represented by plastic pieces 325, which encapsulate interconnect board 302 and optical waveguide 301. Conductive material 331, 330, and conductive member 310 have melting points above that of overmolding temperatures. Typically, conductive material 330, 331, and conductive member 310 have melting points that range from 180 degrees Celsius to 300 degrees Celsius. It should be understood that alignment ferrules 335 are clear of debris. Further, it should be understood that surface 327 of optical waveguide 301 is also free of debris. Alignment ferrules 335 are then engaged by alignment pins 328 of optical connector 329 having fiber optic ribbon 330, thereby providing accurate and repeatable alignment of optical fiber ribbon 330 to waveguide 301.

By now it should be appreciated that a novel method for coupling photonic devices to a waveguide and an optical electronic module have been described. The method allows for the making of optical waveguides and their use in optoelectric modules cost effective. Additionally, this method providing an inexpensive process for combining standard electronic components and optical components.

We claim:

1. An optoelectronic module comprising:

an interconnect board having standard electronic components with an output pad and output leads;

a molded optical waveguide including a core region, a cladding region, a first surface, and portions of the core region and the cladding region forming a first end surface and a second end surface, the first end surface and the second end surface being oppositely opposed with the first surface and the first end surface meeting to form a nexus of the first surface and the first end surface and the first surface and the second end surface meeting to form another nexus of the first surface;

a conductive channel having a first opening at the nexus of the first surface and the first end surface and a second opening at the another nexus of the first surface and the second end surface with the conductive channel extending from first opening to the second opening along the first surface;

an optical component with a working portion, the optical component being mechanically and electrically connected to the molded optical waveguide so that the working portion of the optical component is aligned to the core region of the molded optical waveguide, which is mounted to the interconnect board; and means for electrically connecting the output pad of the standard electronic components to the optical component, thereby interconnecting the standard electronic components to the optical component.

2. An optoelectronic module as claimed in claim 1 wherein the means for connecting the output pad to the optical component is achieved by wire bonding.

3. An optoelectronic module as claimed in claim 1 wherein the optical component includes a photonic device.

4. An optoelectronic module as claimed in claim 3 wherein the photonic device includes a phototransmitter.

5. An optoelectronic module as claimed in claim 3 wherein the photonic device includes a photodetector.

6. An electrically conductive waveguide comprising:

a waveguide including a core region, a cladding region, a first surface, a first end surface, and a second end surface, the cladding region covering a portion of the core region forming the first surface, and a portion of the core region and the cladding region forming the first end surface and the second end surface, the first end surface and the second end surface being oppositely opposed with the first surface and the first end surface meeting to form a nexus of the first surface and the first end surface and the first surface and the second end surface meeting to form another nexus of the first surface and the second end surface; and a conductive channel having an opening at the nexus of the first surface and the first end surface and another opening at the another nexus at the first surface and second end surface with the conductive channel extending from the opening to the another opening along the first surface, wherein the conductive channel is open from the first surface of the waveguide for bonding.

7. An electrically conductive waveguide as claimed in claim 6 further comprising a conductive ball placed in the opening of the conductive channel.

8. An electrically conductive waveguide as claimed in claim 6 further comprising an photonic device operably coupled to the conductive channel.

9. An electrically conductive waveguide as claimed in claim 6 wherein the conductive channel is made of conductive polymer.

10. An electrically conductive waveguide as claimed in claim 6 wherein the conductive polymer is an epoxy.

11. An electrically conductive waveguide as claimed in claim 6 wherein the conductive channel is made of metal.

12. An electrically conductive waveguide as claimed in claim 6 wherein the metal has a melting point ranging from 180 degrees Celsius to 300 degrees Celsius.

* * * * *